United States Patent [19]

Tennyson

[11] Patent Number: 4,933,678

[45] Date of Patent: Jun. 12, 1990

[54] METHOD OF DETECTING OIL SPILLS AT SEA USING A SHIPBORNE NAVIGATIONAL RADAR

[75] Inventor: Edward J. Tennyson, Herndon, Va.

[73] Assignee: The United States of America as represented by the Secretary of the Interior, Washington, D.C.

[21] Appl. No.: 358,049

[22] Filed: May 30, 1989

[51] Int. Cl.⁵ .............................................. G01S 13/00
[52] U.S. Cl. ...................................... 342/176; 342/26
[58] Field of Search ...................... 342/22, 26, 41, 176

[56] References Cited

U.S. PATENT DOCUMENTS

| | | | |
|---|---|---|---|
| 3,016,529 | 1/1962 | Kramp | 342/176 |
| 3,893,110 | 7/1975 | Drake | 342/176 |
| 4,172,255 | 10/1979 | Barrick et al. | 342/176 |

Primary Examiner—Thomas H. Tarcza
Assistant Examiner—Mark Hellner
Attorney, Agent, or Firm—E. Philip Koltos

[57] ABSTRACT

A method is provided wherein standard shipborne navigational radar is used for the purpose of detecting oil-spills on the sea. A homogenous sea-return image is obtained by selectively reducing the sea-clutter, rain, and haze filters of the radar while selectively increasing the gain of the radar. Because oil-spills on the surface of the water minimize the backscatter of radar waves, the location of an oil-spill may be determined by identifying characteristic distortions in the form of zones of diminished sea-return in the homogenous sea-return image. A moving oil spill may be tracked with repeated observations.

2 Claims, 1 Drawing Sheet

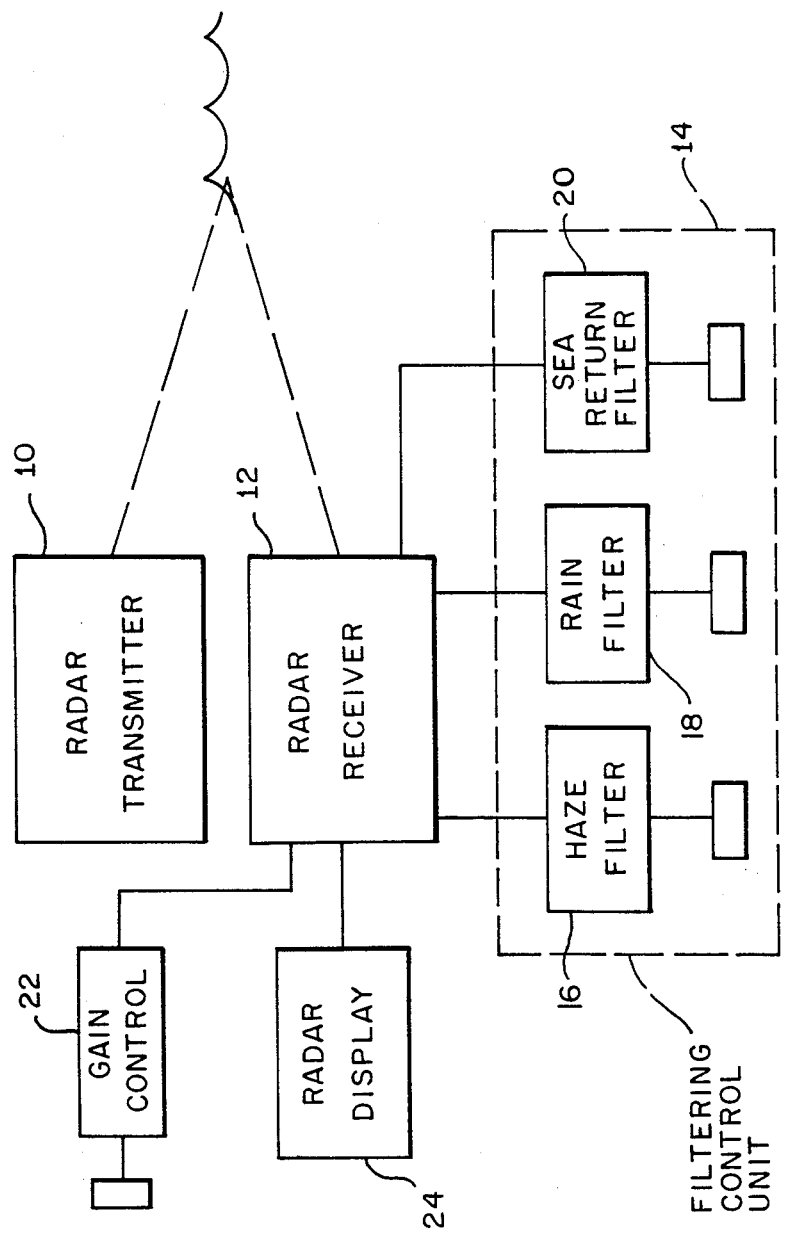

METHOD OF DETECTING OIL SPILLS AT SEA USING A SHIPBORNE NAVIGATIONAL RADAR

ORIGIN OF THE INVENTION

The invention described herein was made by an employee of the United States Government and may be manufactured and used by or for the Government for Government purposes without payment of royalties thereon or therefor.

FIELD OF THE INVENTION

This invention relates to a method of detecting oil spills or slicks at sea and in particular to an oil-slick detection method employing shipborne navigational radar.

DESCRIPTION OF THE PRIOR ART

Oil spills at sea present major ecological problems. To contain an oil spill and thereby protect the environment, it is of the utmost importance to promply determine the size and location of the spill and thereafter reliably track the movement of the spill. To this end, several different methods and devices have been developed for detecting oil spills at sea.

As one example, U.S. Pat. No. 3,899,213, (Fantasia et al.) describes an airborn laser remote sensing system in which pulses of high energy artificial light are directed onto the sea surface causing oil floating thereon to fluoresce, thereby enabling detection of the oil. Other airborne detection techniques have been implemented using x-band radar and synthetic aperture radar. Techniques using x-band or synthetic aperture radar are relatively common, with a number of worldwide operational units being routinely available. Airborne detectors have the advantage of being able to be quickly deployed to the the vicinity of an oil spill and are capable of rapidly searching large areas of the sea. However, airborne detectors are constrained in their usefulness by limited flight time and are unavailable for use in poor weather conditions.

Non-airborne detection techniques have also been developed. Such detectors are typically mounted on bouys or piers, or on land masses adjacent to the sea. For example, U.S. Pat. No. 3,603,952 (Smith) describes a buoy apparatus employing a reflected infrared radiation detector for detecting hydrocarbons products floating on the surface of water immediately beneath the buoy while U.S. Pat. No. 3,783,284 (McCormack) describes an infrared technique utilizing land based sensors for detecting oil spills in adjacent waters.

Non-airborne techniques are capable of operating under virtually any weather conditions and provide for potentially continuous detection. However, such detectors are only capable of detecting oil-spills located in the immediate vicinity of the detector.

It has long been recognized that a virtually ideal apparatus for detecting oil-spills at sea would employ a standard shipborne navigational radar. Shipborne radar offers numerous advantages over other detectors such as those previously described. Shipborne radar offers long range remote sensing capability of potentially unlimited duration. Also, shipborne radar may be readily transported to, and deployed in proximity to, known or suspected oil-spills. Moreover, shipborne radar is capable of operating in under almost any weather conditions. Finally, standard shipborne navigational radar is readily available and therefore no new or highly sophisticated equipment is required.

Heretofore, no successful method has been developed for detecting oil spills using shipborne radar. In fact, the present conventional analysis of radar imagery is that a minimum angle of 20 degrees between an incidence radar beam and the surface of the sea is required to detect oil spills. See, for example, D. S. Simonett, *Manual of Remote Sensing, Volume II, Interpretation and Applications*, American Society of Photography, Falls Church, Va., pp. 1465-1468, (1983). Under most sea conditions an earlier evaluation of shiporn radar (see S. Axelsson, *Remote Sensing of Oil Slicks-Results From a Field Experiment in the Baltic Sea*, September 1974, Saab-Scania AB, Missile Electronics Sector, Ontario) butresses this analysis in that it was determined in that evaluation that the radar detection range for oil spills was limited to approximately one kilometer, even though the radar used in the evaluation had a range of 75 kilometers. Thus it has been widely held that a shipborn navigational radar could not successfully be used to detect remote oil spills.

SUMMARY OF THE INVENTION

The principal object of the present invention is to provide a method for detecting and tracking oil spills on the sea under most sea conditions using a shipborne radar.

Another object of the invention is to provide a reliable method for limiting ecological damage to the environment by accurately tracking the location of moving oil spills.

Another object of this invention is to provide a method for reliably determining the source of an oil-spill on the sea.

Another object of this invention is to provide a method for studying the dissipation of oil on the sea.

The foregoing and other objects of the invention are achieved, broadly speaking, through the provision of a method of detecting oil spills, utilizing a shipborne radar unit. comprising the steps of transmitting radar signals onto the sea, receiving radar signals returned from the sea in response to the the transmitted signals, and selectively reducing the rain, haze and sea clutter filters of the radar unit while selectively increasing the gain of the radar unit so to provide a homogeneous sea-return image and to thereby allow detection of an oil spill by the visual detection of distortions or deviations in the homogenous return caused by the presence of oil on the surface of the sea.

A key feature of the present invention concerns tuning of the radar unit to provide a homogenuous sea-return and in this regard, it is noted that the intentional tuning of a shipborne radar to obtain such a homogenous sea-return is counter to all known accepted practices in traditional radar usage. Normally, the reflection and refraction of the radar beam by short period waves is minimized through the use of a combination of conventional sea return, rain, and haze filters coordinated with control of the return signal amplitude or gain. If sea clutter is present, targets such as navigational aids, other vessel, periscopes, and the like are obscured. Therefore, a homogenous sea-return is something to be avoided when using a shipborne radar in navigational mode.

As noted above, the present invention relies on selectively reducing the effect of the rain, haze and sea-clutter or sea-return filters while selectively increasing the gain of the radar so to provide a homogeneous image of backscatter from the surface of a rough sea. In this latter regard, it is noted that petroleum and other hydrocarbons on the sea surface limit radar backscatter from the sea by attenuating the short period waves and this difference in sea surface texture can be readily detectable by a radar operator. In theory, microwave back-scatter from the ocean surface of X-band radar is due to Bragg scattering by short (approximately 5 cm) waves causing a resonance in the microwave return of the antenna. This resonance yields constructive interference which is apparatus necessary for the discernable depiction of differences in sea surface texture. Therefore, the method of the present invention is primarily applicable to situations where short waves are present on the sea and typically, this requires winds of about three knots or higher.

Other objects, features and advantages of the invention will be set forth in, or be apparent from, the detailed description of the preferred embodiments which follows.

BRIEF DESCRIPTION OF THE DRAWINGS

The single FIGURE of the drawings is a schematic block diagram of conventional radar apparatus used in carrying out a preferred embodiment of the method of the present invention.

DETAILED DESCRIPTION OF THE PREFERRED EMBODIMENTS

Referring to the FIGURE, there is shown in a highly schematic manner a standard navigational radar unit which includes a radar transmitter 10 and a radar receiver 12 for respectively transmitting radar signals and receiving radar signals of selectable radar gain returned from the sea, as is indicated schematically by dashed lines in the drawings. As is also indicated schematically, a filtering control unit 14 associated with receiver 12 includes a haze filter 16 for filtering out the effects of haze from the returned signal, a rain filter 18 for filtering out the effects of rain from the returned signal and a sea-return or sea clutter filter 20 for filtering out the effects of sea clutter from the returned or received signals. A gain control unit 22 controls the amplitude or gain of the returned signal display. The gain control unit 22 and the filters of the filtering control unit 14 are tunable as indicated by the schematic control knobs associated with the units to respectively vary the gain and filtering provided. A radar display unit 24, e.g., a radar scope, provides visual imaging of the filtered radar return signals. The radar unit is, of course, to be mounted on a sea vessel; (not shown) to allow transport of the radar unit to the vicinity of a known or suspected oil spill.

During normal operation, the radar unit described above is employed in a standard navigational mode wherein the radar gain and the degree of filtration are chosen by the radar operator to eliminate substantially all radar backscatter from the sea and to provide imaging, on the radar scope 24, of objects of navigational interest only, such as other vessels.

To detect the presence of petroleum, petroleum products, or other hydrocarbons floating on a rough sea surface, the radar operator selectively decreases the effect of the filter unit 14, and selectively increases the gain provided by the gain control unit 22 so to provide for a homogeneous radar return image of the sea so that wave patterns are depicted throughout at least the center portion of the display provided of the radar scope 16. It will be understood that the specific procedures required to achieve a homogeneous radar return signal depend upon the specific radar apparatus used, and that the appropriate procedures necessary to effect such a homogeneous return would be readily apparent to a radar operator with standard training in this field. It should be noted that if the filtering provided by the filters of filtering unit 14 is decreased to the extent that the display on radar scope 24 is universally bright and individual wave patterns can no longer be tracked, the radar will not detect oil spill slicks, but this operating state can readily be avoided by the experienced radar operator.

As discussed above, hydrocarbons, such as oil, floating on the surface of rough seas limit the backscatter of radar signals. Therefore, once a substantailly homogeneous sea-return image is achieved on the radar scope 24, an oil spill located within the range of the radar unit is visually apparent as a persistent zone of diminished sea-return in the otherwise homogeneous sea-return image on the radar scope. Moreover, the movement of the oil may be tracked by observing the slick periodically or continuously.

In a preferred embodiment, the radar unit is a 50 kilowatt X-band unit with a horizontal beam width of 1.9 degrees and nominal ranges of 0.25, 0.5, 0.75, 1.5, 3, 6, 12, 14, 24, 48 and 120 nautical miles. The transmitting antenna (not shown) associated with transmitter 10 is ideally positioned as high as possible above the sea surface and in this regard, a height of 40 to 50 feet has been provided effective. In an alternate embodiment, the radar unit comprises a 25 kilowatt X-band unit with a horizontal beam width of 1.9 degrees and nominal ranges of 0.25, 0.5, 0.75, 1.5, 3, 6, 12, 24, 48 and 60 nautical miles. However, it should be understood that radar units of less power can and have been used successfully by the inventor to detect oil slicks out to a distance of at least 12 nautical miles.

Although the invention has been described with respect to exemplary embodiments thereof, it will be understood by those skilled in the art that variations and modifications can be effected in these exemplary embodiments without departing from the scope or spirit of the invention.

The nominal radar ranges stated above represent the maximum theoretical distance for radar wave propagation and return, in actual practice, the curvature of the earth and radar wave attenuation caused by the atmosphere limits radar operations from ships to approximately so nautical miles. These same constraints would apply to oil spill detection.

What is claimed is:

1. A method for relatively long range tracking of the location of petroleum and petroleum products on a body of water using a radar apparatus including filter means, including a sea-return filter, and haze and rain filters, for filtering radar return signals, gain control means for varying the amplification of the radar return signals, and a viewing scope for viewing said radar return signals, said method comprising:

transmitting radar signals onto the surface of a body of water;

receiving return radar signals backscattered from the body of water;

imaging said radar return signals on said radar scope to enable viewing of wave patterns corresponding to said return signals;

selectively reducing the filtering of said return signals provided by said sea-return filter and said haze and rain filters while selectively controlling said gain control mains to vary the amplitude of said radar return signals so to produce a homogeneous wave pattern at least throughout the central region of said radar scope while preventing the image on the scope from becoming bright throughout; and detecting any distortions in said homogenous wave pattern caused by the presence of petroleum products on the rough body of water.

2. A method of tracking an oil-spill at sea, said method comprising:

positioning a radar, having variable gain and having a sea-clutter filter, in the vicinity of the oil-spill;

transmitting radar signals from said radar onto the sea;

receiving return signals from the sea in response to the transmitted radar signals;

selectively controlling said sea clutter filter while selectively increasing said gain of the radar so to provide a homogenous radar return from the sea; and detecting any distortions in the homogenous return caused by the presence of oil on the sea.

* * * * *